United States Patent
Tieke et al.

(10) Patent No.: US 9,428,369 B2
(45) Date of Patent: Aug. 30, 2016

(54) ARTICULATED SLEWING JIB CRANE AND WIND TURBINE INCORPORATING SAME

(71) Applicant: General Electric Company, Schenectady, NY (US)

(72) Inventors: Christian Tieke, Lingen (DE); Stefan Voss, Salzbergen (DE); Holger Luehn, Wietmarschen (DE)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 14/023,707

(22) Filed: Sep. 11, 2013

(65) Prior Publication Data

US 2015/0071790 A1    Mar. 12, 2015

(51) Int. Cl.
| | |
|---|---|
| *F03D 11/00* | (2006.01) |
| *F03D 11/04* | (2006.01) |
| *B66C 23/20* | (2006.01) |

(Continued)

(52) U.S. Cl.
CPC ............ *B66C 23/207* (2013.01); *B66C 23/04* (2013.01); *F03D 1/001* (2013.01); *F03D 1/003* (2013.01); *F03D 13/20* (2016.05); *F05B 2240/916* (2013.01); *Y02E 10/728* (2013.01)

(58) Field of Classification Search
CPC ........ F03D 1/003; F03D 1/005; F03D 1/001; F03D 11/04; F05B 2240/912; F05B 2240/916; Y02E 10/728; B66C 21/02; B66C 21/06; B66C 23/00; B66C 23/02; B66C 23/025; B66C 23/027; B66C 23/16; B66C 23/18; B66C 23/185; B66C 23/20; B66C 23/207; B66C 23/208; B66C 23/22; B66C 23/24

USPC ........ 416/146 R, 244 R, 244 A, 246, DIG. 6
See application file for complete search history.

(56) References Cited

U.S. PATENT DOCUMENTS

| | | | | |
|---|---|---|---|---|
| 1,540,630 | A * | 6/1925 | Jenks | B66C 23/208 212/223 |
| 2,362,416 | A * | 11/1944 | Spoliansky | B66C 23/208 212/247 |
| 4,002,243 | A * | 1/1977 | Kramer | B66C 23/208 16/368 |

(Continued)

FOREIGN PATENT DOCUMENTS

| | | | | |
|---|---|---|---|---|
| DE | 2747291 | * | 4/1979 | ............. B66C 23/02 |
| DE | 3537577 A1 | * | 4/1987 | ............. B66C 23/04 |

(Continued)

OTHER PUBLICATIONS

Machine translation of DE-2747291, Apr. 1979.*

(Continued)

*Primary Examiner* — Christopher Verdier
(74) *Attorney, Agent, or Firm* — James W. Pemrick; Ernest G. Cusick; Frank A. Landgraff (57) ABSTRACT

A jib crane includes a first arm configured for cooperation with a hoist, and a second arm hingedly connected to the first arm. A mounting bracket is hingedly connected to the second arm, and the mounting bracket is configured for attachment to a wind turbine. The first arm is configured to swing along a first horizontal arc and the second arm is configured to swing along a second horizontal arc. The jib crane is configured to pick up a load outside the wind turbine and move the load to a location inside the wind turbine.

19 Claims, 11 Drawing Sheets

(51) Int. Cl.
*F03D 1/00* (2006.01)
*B66C 23/04* (2006.01)

(56) References Cited

U.S. PATENT DOCUMENTS

| | | | |
|---|---|---|---|
| 6,499,610 B2 | 12/2002 | Spitsbergen | |
| 6,983,856 B1* | 1/2006 | Burks | B66C 23/20 |
| | | | 212/179 |
| 2009/0223139 A1* | 9/2009 | Meiners | F03D 1/001 |
| | | | 52/40 |
| 2010/0061808 A1* | 3/2010 | Smith | B66C 23/26 |
| | | | 405/184.4 |
| 2010/0111665 A1* | 5/2010 | Daniels | B66C 23/207 |
| | | | 414/814 |
| 2010/0132278 A1* | 6/2010 | Gurk | E04F 11/025 |
| | | | 52/184 |
| 2015/0086367 A1* | 3/2015 | Holloway | F03D 1/003 |
| | | | 416/146 R |

FOREIGN PATENT DOCUMENTS

| | | | |
|---|---|---|---|
| DE | 102010041940 A1 | 5/2012 | |
| EP | 2147885 B1 | 2/2013 | |
| FR | 2841887 A1 * | 1/2004 | ............ B66C 23/62 |
| GB | 2487230 A | 7/2012 | |
| WO | 2012045741 A1 | 4/2012 | |
| WO | 2012098384 A1 | 7/2012 | |

OTHER PUBLICATIONS

Machine translation of FR-2841887, Jan. 2004.*
Machine translation of DE-3537577, Apr. 1987.*

* cited by examiner

ARTICULATED SLEWING JIB CRANE AND WIND TURBINE INCORPORATING SAME

BACKGROUND OF THE INVENTION

This invention relates generally to jib cranes and wind turbines, and more specifically to an articulated slewing jib crane mounted on a wind turbine.

Recently, wind turbines have received increased attention as environmentally safe and relatively inexpensive alternative energy sources. Wind turbines do not emit greenhouse gases (GHGs), and therefore, do not contribute to global warming Wind turbines also allow a country to become more energy independent, by the domestic production of electrical energy. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades or rotor) for converting the movement of air into a mechanical motion (e.g., rotation), which is then converted with a generator into electrical power.

During construction of wind turbines, or their regular maintenance, heavy components (e.g., power converters, control panels, transformers, etc.) must be lifted into the tower. This can be challenging due to height differences, limited space and obstructions like the tower stairs, tower door and door step. The tower stairs are typically narrow and may be difficult to navigate while carrying a heavy load. The tower door is narrow and this makes it difficult to carry heavy items through the doorway.

BRIEF SUMMARY OF THE INVENTION

According to one aspect of the invention, a jib crane includes a first arm configured for cooperation with a hoist, and a second arm hingedly connected to the first arm. A mounting bracket is hingedly connected to the second arm, and the mounting bracket is configured for attachment to a wind turbine. The first arm is configured to swing along a first horizontal arc and the second arm is configured to swing along a second horizontal arc. The jib crane is configured to pick up a load outside the wind turbine and move the load to a location inside the wind turbine.

According to another aspect of the invention, a wind turbine includes a tower, a nacelle mounted on the tower, and a rotor connected to the nacelle, the rotor including a hub and a plurality of blades. The wind turbine also includes a jib crane having a first arm configured for cooperation with a hoist, and a second arm hingedly connected to the first arm. A mounting bracket is hingedly connected to the second arm, and the mounting bracket configured for attachment to the wind turbine. The first arm is configured to swing along a first horizontal arc and the second arm is configured to swing along a second horizontal arc. The jib crane is configured to pick up a load outside the wind turbine and move the load to a location inside the wind turbine.

DETAILED DESCRIPTION OF THE INVENTION

As used herein, the term "wind turbine" is intended to be representative of any device that generates rotational energy from wind energy, and more specifically, converts kinetic energy of the wind into mechanical energy. One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
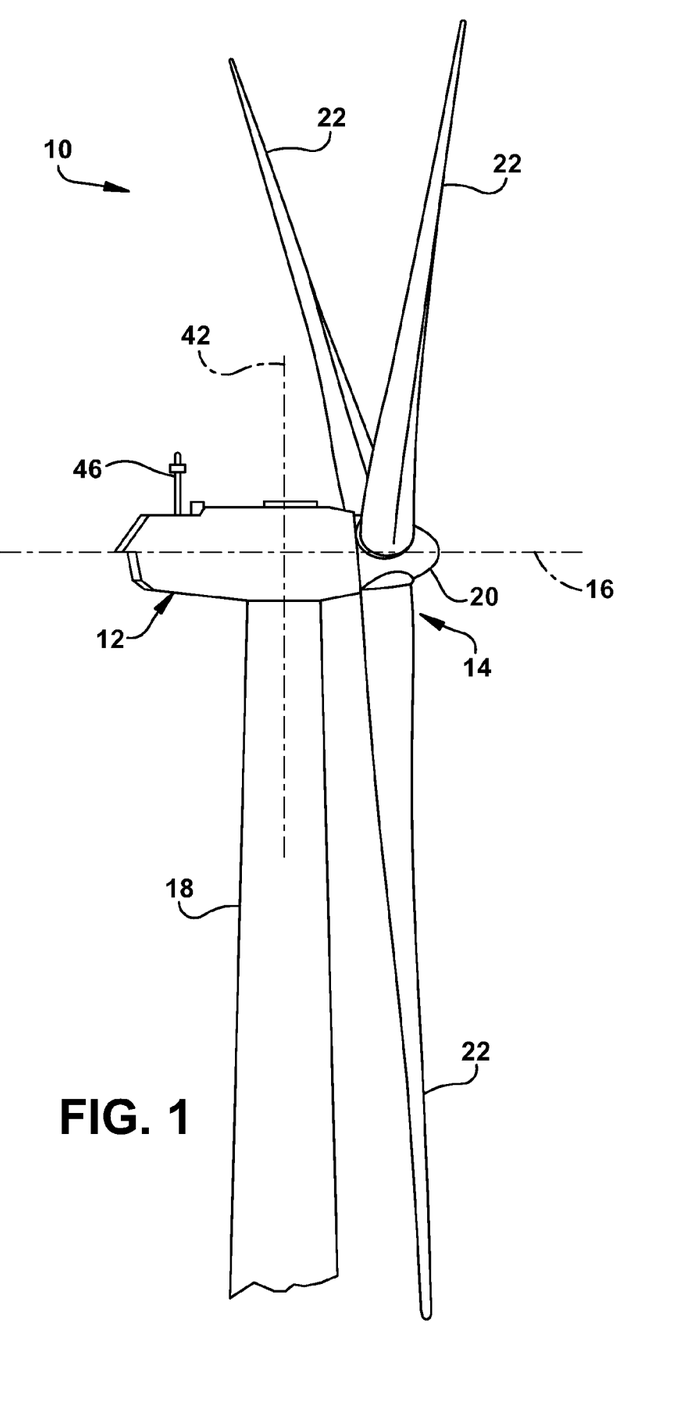
FIG. 1 is a perspective illustration of an exemplary wind turbine.

FIG. 1 is a perspective view of an exemplary embodiment of a wind turbine 10. Wind turbine 10 described and illustrated herein is a wind generator for generating electrical power from wind energy. In some known wind turbines, wind turbine 10 is any type of wind turbine, such as, but not limited to, a windmill (not shown). Moreover, wind turbine 10 described and illustrated herein includes a horizontal-axis configuration. In some known wind turbines, wind turbine 10 includes a vertical-axis configuration (not shown). Wind turbine 10 may be coupled to an electrical load (not shown), such as, but not limited to, a power grid (not shown), and may receive electrical power therefrom to drive operation of wind turbine 10 and/or its associated components and/or may supply electrical power generated by wind turbine 10. Although only one wind turbine 10 is shown in FIG. 1, in some embodiments a plurality of wind turbines 10 are grouped together, to form a "wind farm".

Wind turbine 10 includes a nacelle 12, and a rotor (generally designated by 14) coupled to nacelle 12 for rotation with respect to nacelle 12 about an axis of rotation 16. In the exemplary embodiment, nacelle 12 is mounted on a tower 18, and the nacelle 12 may yaw (rotate) about axis of rotation 42. The height of tower 18 is any suitable height enabling wind turbine 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may include any number of blades 22. Wind turbine 10 may also include metrology components 46, which may include anemometers, temperature sensors, etc.

Figure 2:
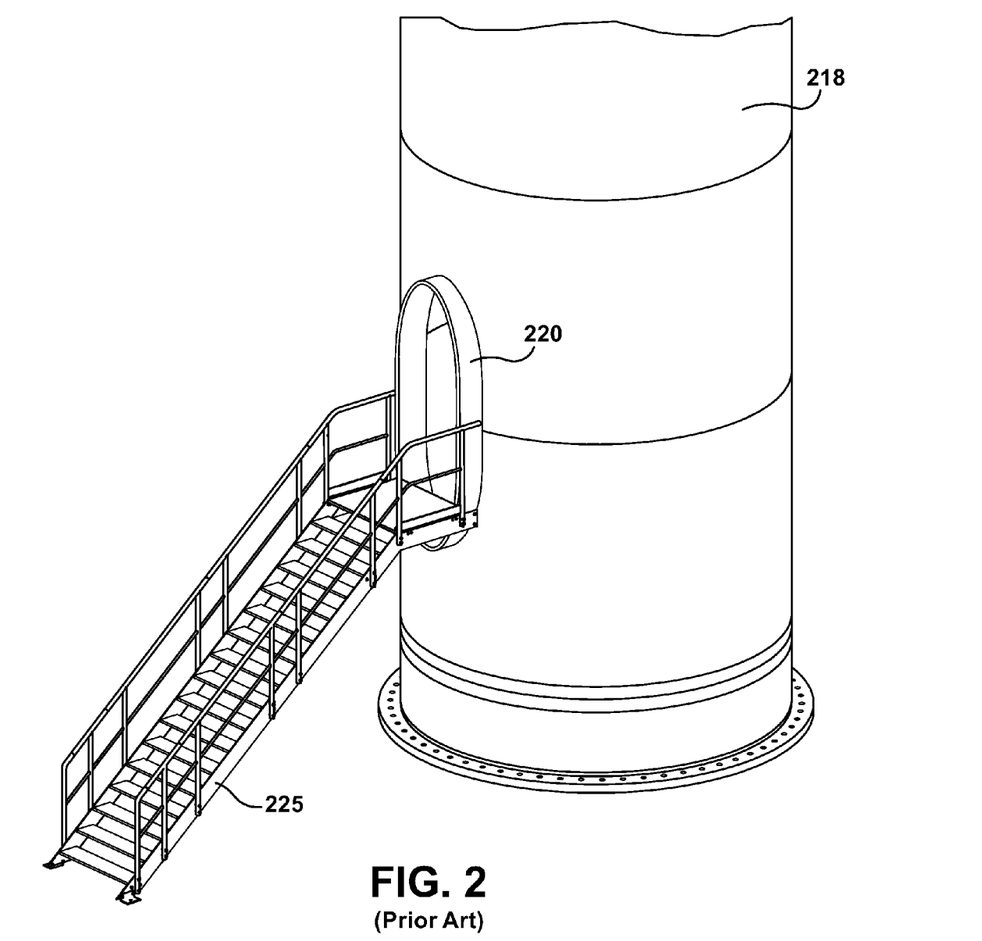
FIG. 2 is a perspective illustration of a bottom portion of one known wind turbine.

FIG. 2 illustrates a perspective view of a bottom portion of one known wind turbine tower 218. The tower 218 includes a door frame 220 used for mounting a door (not shown). A set of stairs 225 extend from the ground to the tower door. It can be seen that there may be a height difference between the bottom and top of the tower stairs 225, and that the stairs offer a narrow passageway. Depending on component weights, manual lifting may be difficult or impossible. These attributes make it difficult to transport large or heavy items from outside the tower to inside the tower through the doorway or frame 220.

Figure 3:
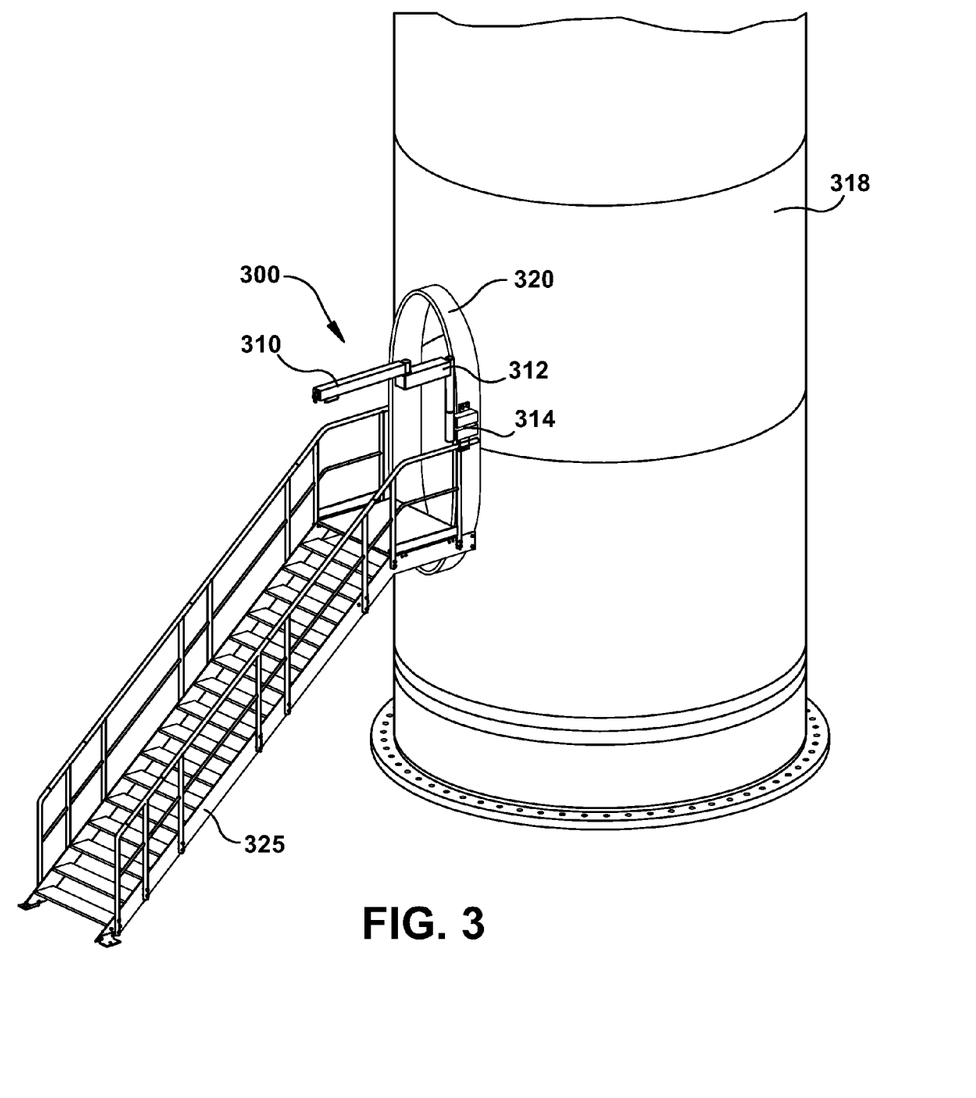
FIG. 3 is a perspective illustration of a bottom portion of a wind turbine, incorporating a jib crane, according to an aspect of the present invention.

FIG. 3 illustrates a perspective view of a bottom portion of a wind turbine tower 318 incorporating a jib crane, according to an aspect of the present invention. The jib crane 300 is mounted on the door frame 320. The jib crane 300 may be configured as an articulated slewing jib crane and may be used to hoist payloads up and into the tower 318. A first arm 310 is configured for cooperation with a hoist (not shown in FIG. 3), and a second arm 312 is hingedly connected to the first arm 310. A mounting bracket 314 is hingedly connected to the second arm 312, and the mounting bracket 314 is configured for attachment to the wind turbine 10.

Figure 4:
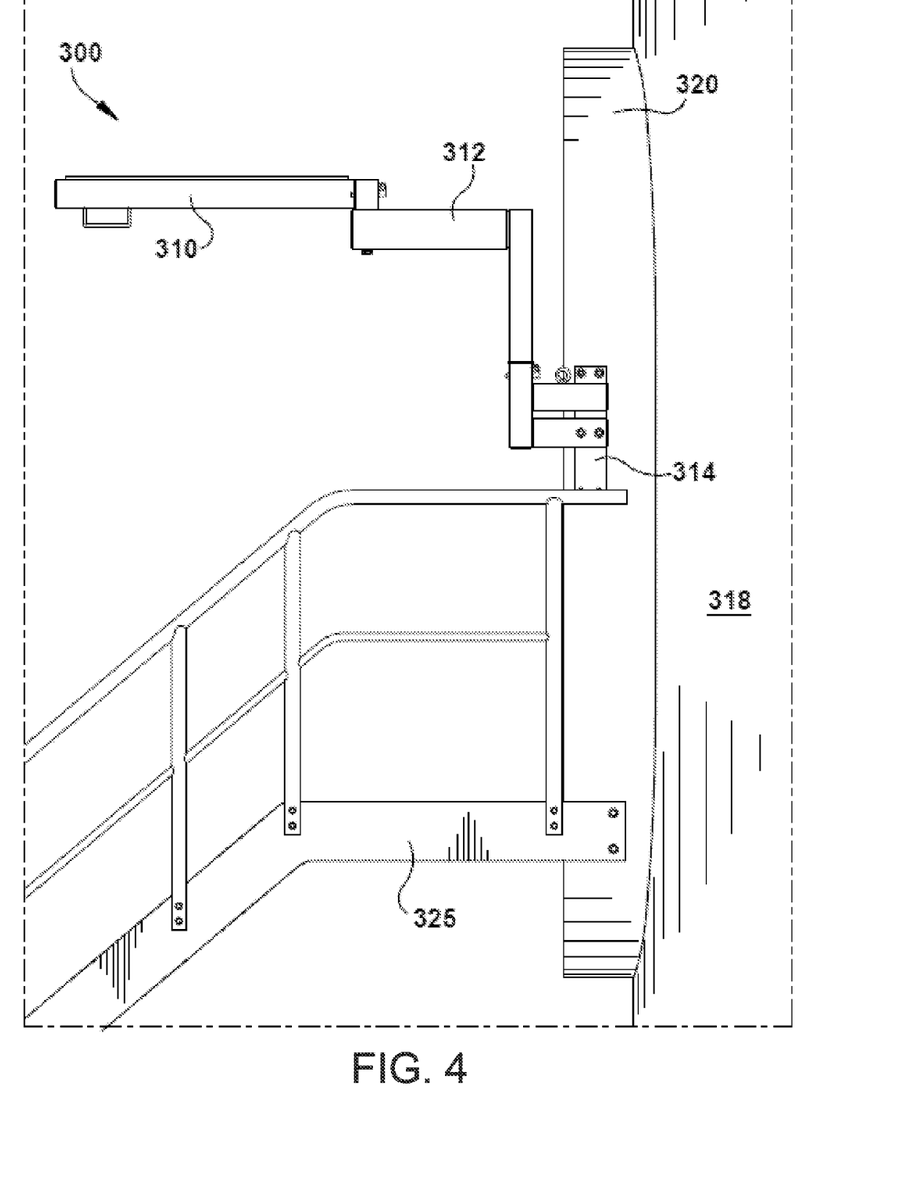
FIG. 4 illustrates an enlarged perspective view of a bottom portion of a wind turbine tower incorporating the jib crane, according to an aspect of the present invention

FIG. 4 illustrates an enlarged perspective view of a bottom portion of a wind turbine tower 318 incorporating the jib crane 300, according to an aspect of the present invention. Mounting bracket 314 is bolted to the door frame 320. The mounting bracket 314 may also be clamped to the door frame 320. According to one aspect of the present invention, the mounting bracket 314 is at least one of, bolted to the door frame 320 or clamped to the door frame 320. As will be described in more detail hereinafter, the first arm 310 is configured to swing along a first horizontal arc and the second arm 312 is configured to swing along a second horizontal arc. This configuration allows the jib crane 300 to pick up a load outside the wind turbine and move the load to a location inside the wind turbine through door frame 320.

Figure 5:
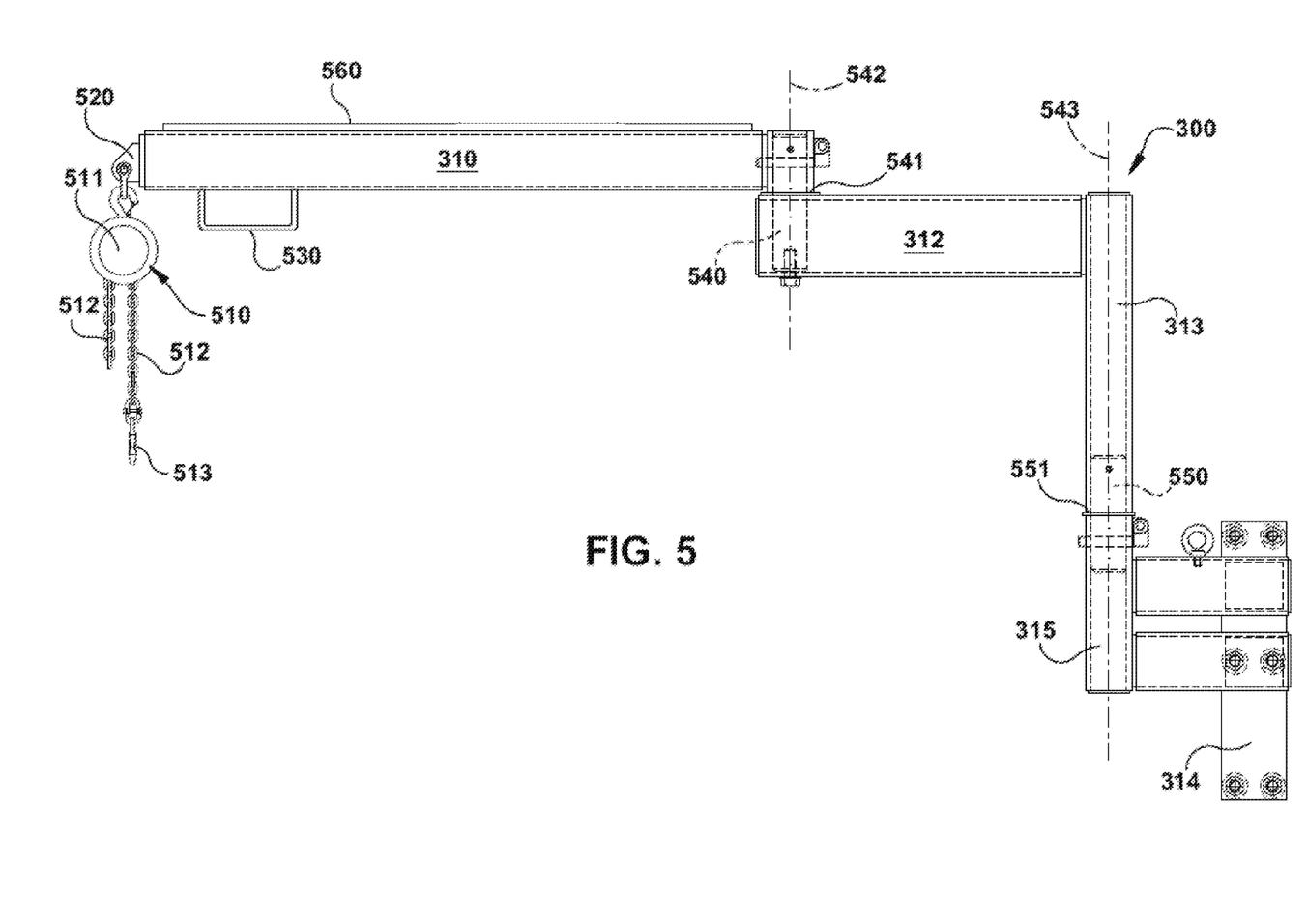
FIG. 5 illustrates a detailed view of the jib crane, according to an aspect of the present invention.
Figure 11:
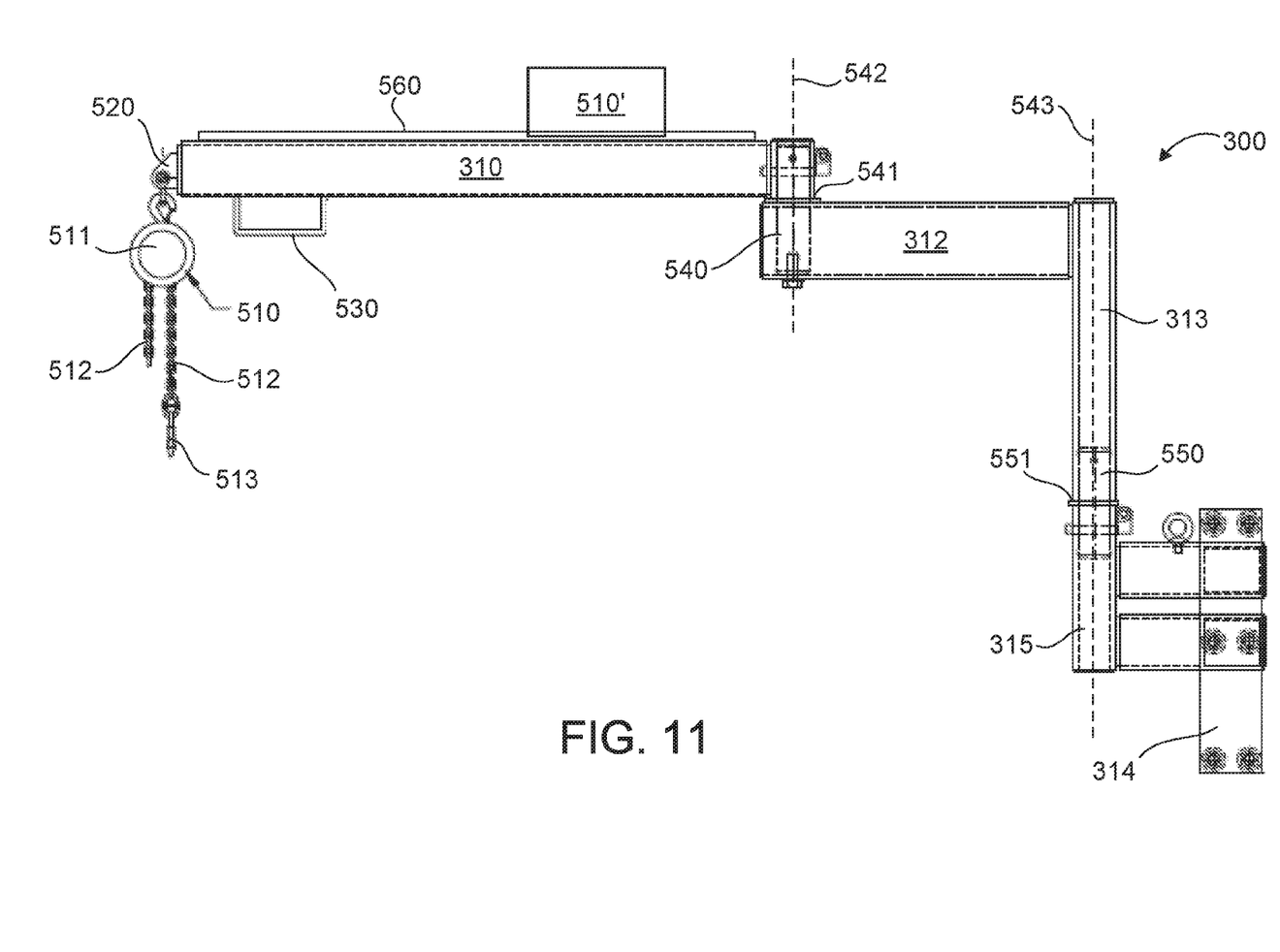
FIG. 11 illustrates a detailed view of the jib crane, according to an aspect of the present invention.

FIG. 5 illustrates a detailed view of the jib crane 300. The jib crane 300 may include a hoist 510 attached to the first arm 310. The hoist 510 may be either manually, electrically or pneumatically operated and use a wire rope or chain attached to a hook. As one example only, the hoist 510 has a pulley system 511, chain 512 and hook 513. The hoist may be attached to or hung off bracket 520 that is connected or integrally formed with first arm 310. Alternatively and referring to FIG. 11, the hoist 510' may be located on first arm 310, and in this embodiment the first arm 310 would include a pulley located near the end of first arm 310 proximal to (and/or replacing) bracket 520. The first arm 310 may also include a handle 530 configured for facilitating movement of the first arm 310. For example, a user may grasp, or otherwise make contact with, handle 530 and manually move the jib crane and first arm 310 to a desired location.

The first arm 310 is connected to the second arm via a first hinge pin 540. The first hinge pin 540 is placed inside both the first arm 310 and second arm 320, and this configuration enables the first arm to rotate (or pivot) about a central axis 542 of the first hinge pin 540. Optionally, a washer 541 and/or the adjacent sections of the first arm 310 and second arm 320 may include a low friction coating, such as polytetrafluoroethylene (PTFE), or any suitable bearing system.

The second arm 312 is connected to the mounting bracket 314 via a second hinge pin 550. The second arm includes a horizontally disposed arm 312 connected to a vertically oriented section 313, and both sections form a generally L-shaped member. The second hinge pin 550 is placed inside both the second arm vertical section 313 and mounting bracket insert 315, and this configuration enables the second arm to rotate (or pivot) about a central axis 543 of the second hinge pin 550. Optionally, a washer 551 and/or the adjacent sections of the second arm vertical section 313 and mounting bracket insert 315 may include a low friction coating, such as polytetrafluoroethylene (PTFE), or any suitable bearing system. The first arm 310 may also include a track 560 configured to permit the hoist 510' (see FIG. 11) to travel along the first arm 310. The track 310 may also include locking means to lock the hoist 510' in multiple positions (or locations) along the track 560. The locking means may comprise stop screws or bolts, clamps or any other suitable means for locking the hoist in a specific position along track 560.

Figure 6:
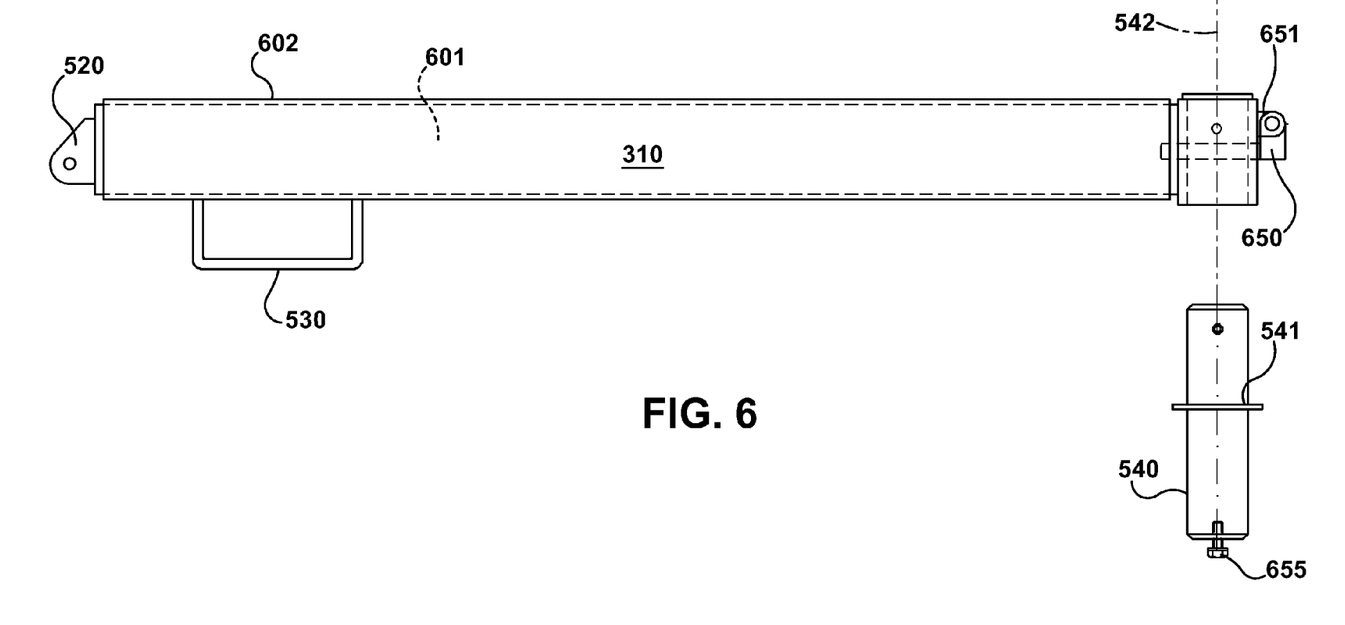
FIG. 6 illustrates an enlarged and exploded view of the jib crane's first arm and first hinge pin, according to an aspect of the present invention.

FIG. 6 illustrates an enlarged and exploded view of the first arm 310 and first hinge pin 540. The first arm may include a locking pin 650 that is inserted into the first arm 310 as well as the hinge pin 540 to lock the two together. The first arm 310 may include a hasp 651 through which a lock (e.g., a padlock) may be passed to lock the locking pin 650. A locked or parked position may be desirable when the jib crane 300 will not be used, so that the jib crane can be stored in a safe position. The hinge pin 540 may also include a fastener 655 which is used to secure the hinge pin 540 to the second arm 312. It is to be understood that the first arm 310 and the second arm 312 may rotate with respect to the hinge pin 540 with respect to axis 542. The first arm 310 may also be configured to telescopically extend and retract. The first arm 301 may include a telescoping inner arm 601 and a stationary outer arm 602, where the inner arm 601 can slide into and out of the outer arm 602. Alternatively, a different configuration could be used that employs a telescoping outer arm 602 and a stationary inner arm 601. The telescoping arm feature may be used to extend the operating reach of the crane 300.

Figure 7:
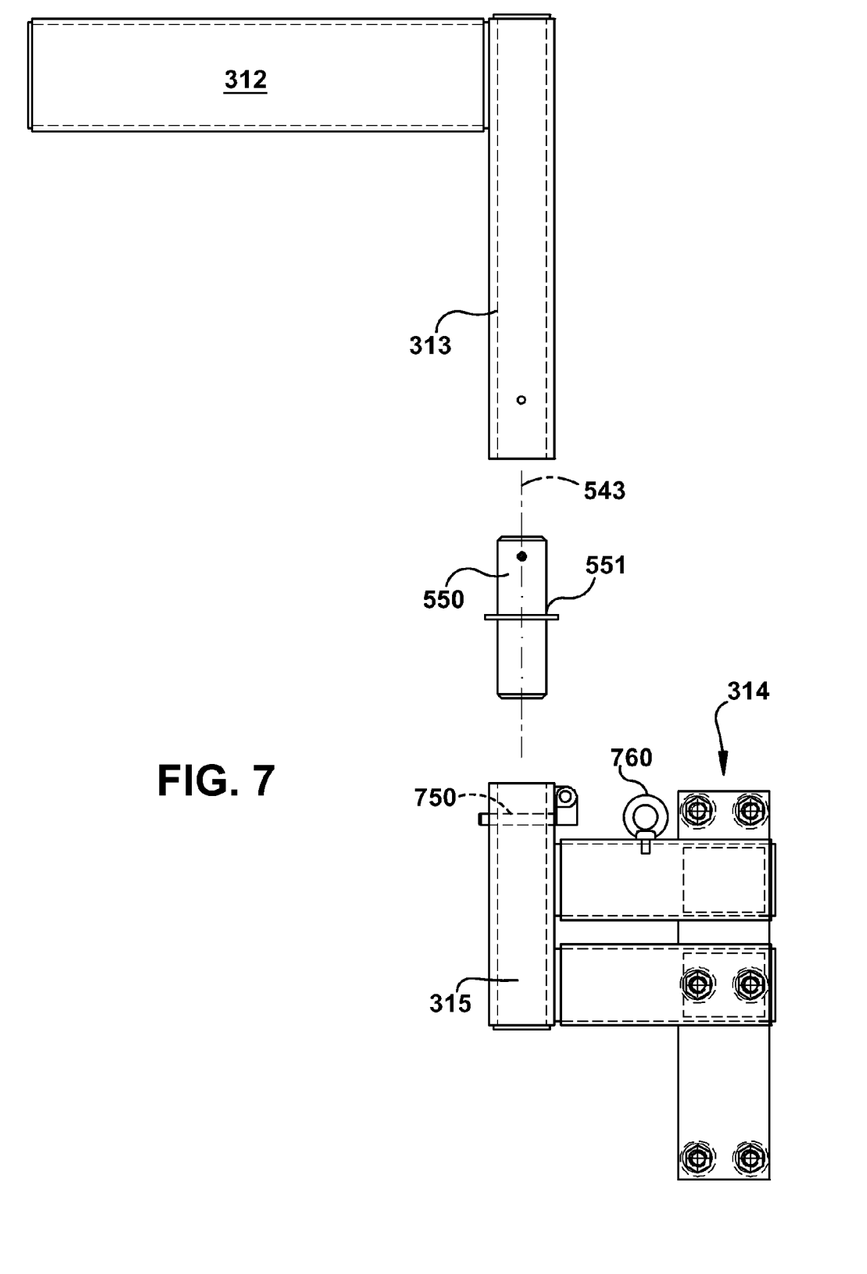
FIG. 7 illustrates an exploded view of the jib crane's second arm, second hinge pin and mounting bracket, according to an aspect of the present invention.

FIG. 7 illustrates an exploded view of the second arm 312, second hinge pin 550 and mounting bracket 314. The vertically oriented section 313 of the second arm 312 may include a locking pin 750 that is inserted into the mounting bracket insert 315 as well as the hinge pin 550 to lock the two together. An attachment pin 760 may be used to lock the mounting bracket insert 315 into the mounting bracket 314. In use, the second flanged hinge pin 550 is inserted into both the vertically oriented section 313 and the mounting bracket insert 315. The vertically oriented section 313 rotates (or pivots) with respect to axis 543.

Figure 8:
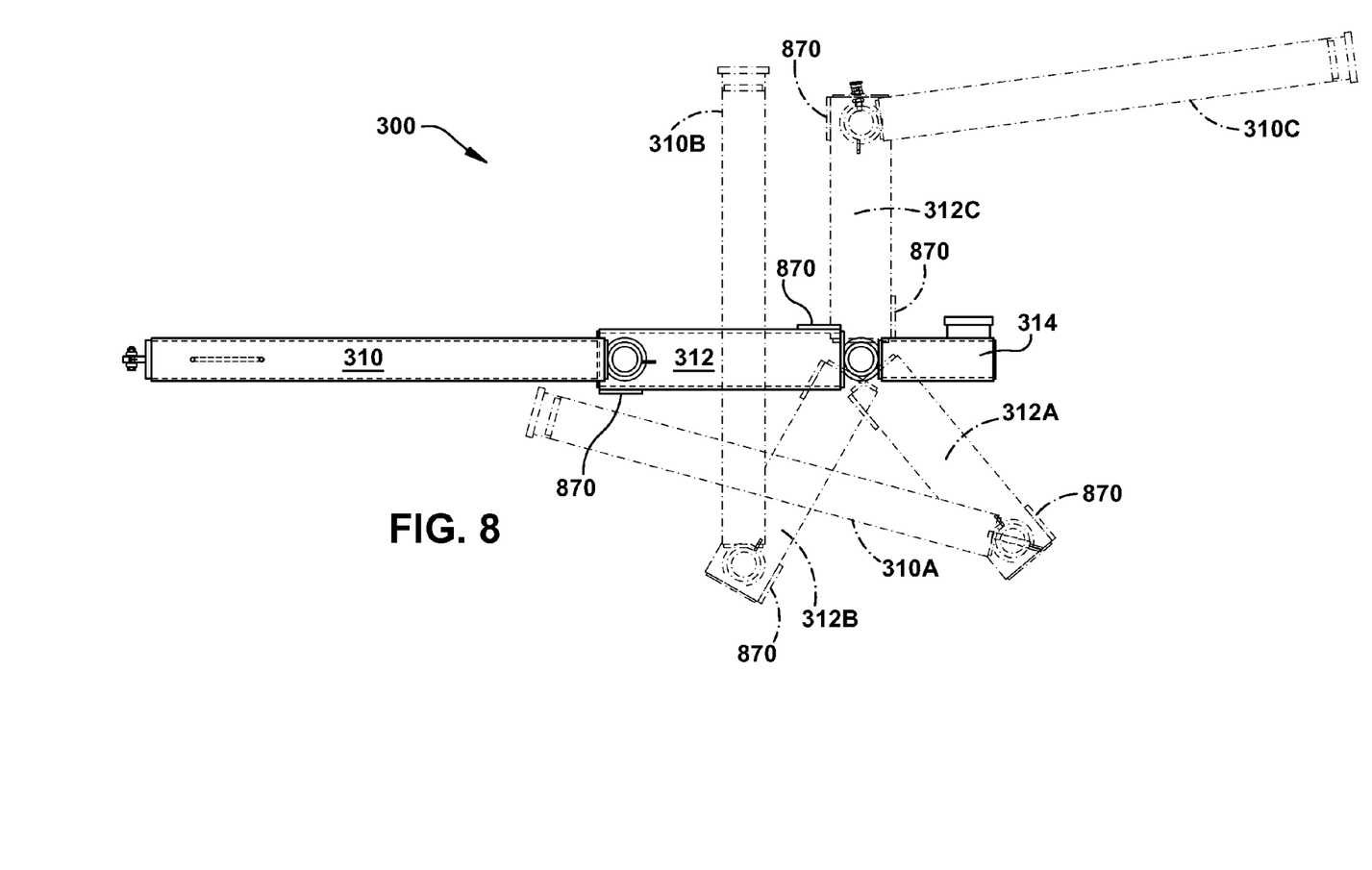
FIG. 8 illustrates a top view of various positions of the jib crane's first arm and second arm, according to an aspect of the present invention.

FIG. 8 illustrates various positions of the first arm 310 and second arm 312 of jib crane 300. The maximum radial reach is illustrated by the position of first arm 310 and second arm 312, and in this orientation both arms are positioned to extend directly away from the wind turbine. The position indicated by first arm 310A and second arm 312A indicate a parked position, and in this position protective pad 870 may contact the outer wall of the wind turbine tower. The protective pad 870 may be formed of rubber or closed cell foam, or any other suitable material that protects from abrasion or contact between the first arm 310 or second arm 312 and the tower 318 or other parts of the wind turbine. In this position the first arm 310A may also swing outward (or down with respect to the Figure) if it is not locked in position. The position indicated by first arm 310B and second arm 312B indicate an intermediate position that may be used when moving a payload into the tower 318. The position indicated by first arm 310C and second arm 312C indicate a possible destination position where the first arm 310C extends through doorway 320 and into tower 318. A payload hanging from the end of first arm 310C would now be inside the tower 318. The protective pads 870 may be attached to at least one of the first arm 310 and the second arm 312.

Figure 9:
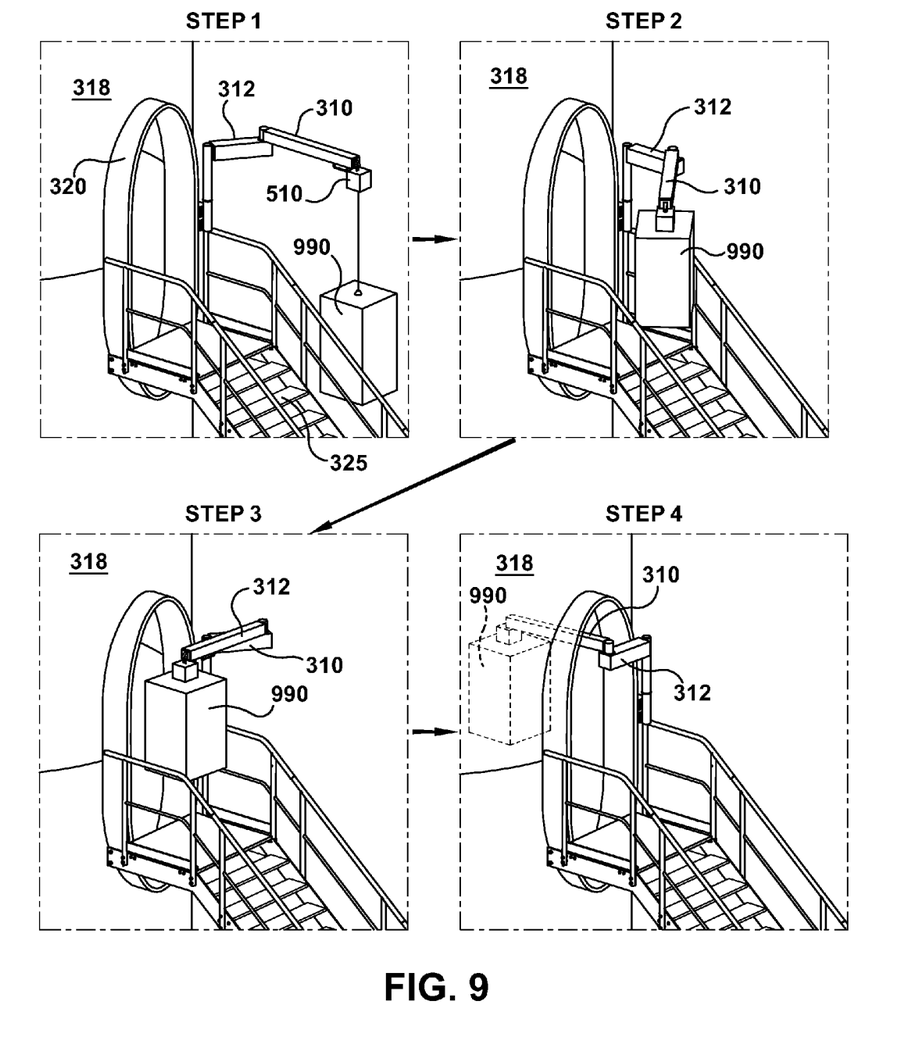
FIG. 9 illustrates a series of steps where the jib crane is used to move a payload from outside the tower to inside the tower, according to an aspect of the present invention.

FIG. 9 illustrates a series of steps, similar to FIG. 8, where the jib crane 300 is used to move a payload from outside the tower to inside the tower. Step 1 shows the payload 990 being picked up by hoist 510. The payload 990 may be located on the ground outside the tower 318. Step 2 illustrates the payload 990 hoisted up and positioned over the stairs 325. Step 3 shows the first 310 and second 312 arms manipulated so that the payload 990 begins to pass through the doorway 320. Step 4 shows that the payload 990 has passed through the doorway 320 and is now completely within the tower 318. The payload can be lowered or connected to additional hoist means located in wind turbine 10.

Figure 10:
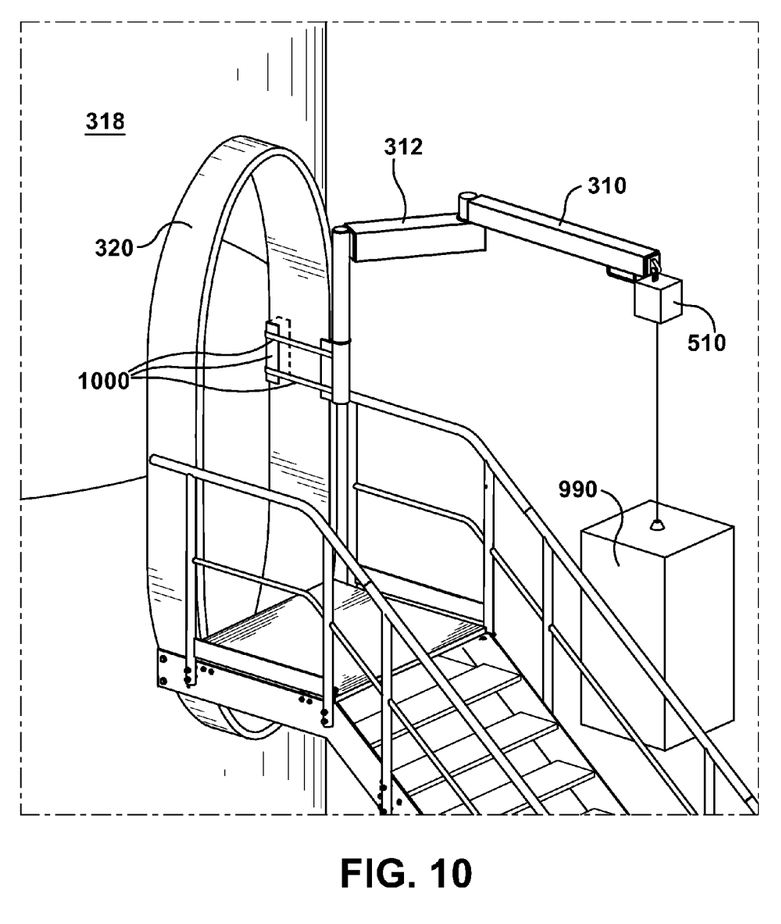
FIG. 10 illustrates a perspective view of the jib crane attached to the wind turbine by a clamp, according to an aspect of the present invention.

FIG. 10 illustrates a perspective view of the jib crane 300 attached to the wind turbine by a clamp 1000. The clamp 1000 may be configured to clamp onto the doorway frame 320. For example, the clamp 1000 may clamp onto inner and outer portions of the doorway, as shown. However, the clamp 1000 could also clamp only onto the outer portion of the doorway 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A jib crane comprising:
   a first arm, the first arm configured for cooperation with a hoist;
   a second arm hingedly connected to the first arm;
   a mounting bracket, the mounting bracket hingedly connected to the second arm, the mounting bracket attached to a door frame of a wind turbine;
   wherein, the first arm is configured to swing along a first horizontal arc and the second arm is configured to swing along a second horizontal arc, and wherein the jib crane is configured to pick up a load outside the wind turbine and move the load to a location inside the wind turbine.

2. The jib crane of claim 1, wherein the first arm includes the hoist.

3. The jib crane of claim 2, wherein the hoist is attached to a bracket on the first arm.

4. The jib crane of claim 2, the first arm further comprising:
   a track configured to permit the hoist to travel along the first arm.

5. The jib crane of claim 1, further comprising:
   a first hinge pin connecting the first arm and the second arm; and
   a second hinge pin connecting the second arm and the mounting bracket.

6. The jib crane of claim 1, further comprising:
   a handle on the first arm, the handle configured for facilitating movement of the first arm.

7. The jib crane of claim 1, wherein the mounting bracket is bolted to the door frame.

8. The jib crane of claim 1, wherein the mounting bracket is clamped to the door frame.

9. The jib crane of claim 1, further comprising a protective pad attached to at least one of the first arm and the second arm.

10. The jib crane of claim 1, the first arm further comprising:
    a telescoping arm and a stationary arm, wherein the telescoping arm is extendible to increase an operating reach of the jib crane.

11. A wind turbine comprising:
    a tower;
    a nacelle mounted on the tower;
    a rotor connected to the nacelle, the rotor including a hub and a plurality of blades;
    a jib crane comprising:
       a first arm, the first arm configured for cooperation with a hoist;
       a second arm hingedly connected to the first arm;
       a mounting bracket, the mounting bracket hingedly connected to the second arm, the mounting bracket attached to a door frame of the wind turbine;
    wherein, the first arm is configured to swing along a first horizontal arc and the second arm is configured to swing along a second horizontal arc, and wherein the jib crane is configured to pick up a load outside the wind turbine and move the load to a location inside the wind turbine.

12. The wind turbine of claim 11, wherein the first arm includes the hoist.

13. The wind turbine of claim 12, wherein the hoist is attached to a bracket on the first arm.

14. The wind turbine of claim 12, further comprising:
   a first hinge pin connecting the first arm and the second arm; and
   a second hinge pin connecting the second arm and the mounting bracket.

15. The wind turbine of claim 13, further comprising:
   a handle on the first arm, the handle configured for facilitating movement of the first arm.

16. The jib crane of claim 12, wherein the mounting bracket is at least one of: bolted to the door frame or clamped to the door frame.

17. The wind turbine of claim 12, further comprising a protective pad attached to at least one of the first arm and the second arm.

18. The wind turbine of claim 12, the first arm further comprising:
   a track configured to permit the hoist to travel along the first arm.

19. The wind turbine of claim 12, the first arm further comprising:
   a telescoping arm and a stationary arm, wherein the telescoping arm is extendible to increase an operating reach of the jib crane.

* * * * *